(12) United States Patent
Polubinski, Jr. et al.

(10) Patent No.: US 9,747,253 B2
(45) Date of Patent: Aug. 29, 2017

(54) SYSTEM AND METHOD FOR SIMULTANEOUS ARTICLE RETRIEVAL AND TRANSACTION VALIDATION

(75) Inventors: Jim Polubinski, Jr., Palos Hills, IL (US); William Ptacek, Aurora, IL (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 1366 days.

(21) Appl. No.: 13/489,337

(22) Filed: Jun. 5, 2012

(65) Prior Publication Data

US 2013/0325176 A1 Dec. 5, 2013

(51) Int. Cl.
*G06F 17/00* (2006.01)
*G07F 11/54* (2006.01)
*G07F 9/00* (2006.01)

(52) U.S. Cl.
CPC .............. *G06F 17/00* (2013.01); *G07F 9/006* (2013.01); *G07F 11/54* (2013.01)

(58) Field of Classification Search
USPC ....................................................... 700/237
See application file for complete search history.

(56) References Cited

U.S. PATENT DOCUMENTS

| | | |
|---|---|---|
| 2,098,697 A | 11/1937 | Vanderput |
| 3,267,436 A | 8/1966 | Alpert |
| 3,379,295 A | 4/1968 | Varley |
| 3,529,155 A | 9/1970 | Hansen |
| 3,622,995 A | 11/1971 | Dilks et al. |
| 3,648,241 A | 3/1972 | Naito et al. |
| 3,824,544 A | 7/1974 | Simjian |

(Continued)

FOREIGN PATENT DOCUMENTS

| | | |
|---|---|---|
| CA | 2302753 | 5/1999 |
| CA | 1236546 | 1/2000 |

(Continued)

OTHER PUBLICATIONS

Patent Cooperation Treaty International Search Report for Application PCT/US2005/12563 mailed Aug. 10, 2005.

(Continued)

*Primary Examiner* — Gene Crawford
*Assistant Examiner* — Stephen Akridge
(74) *Attorney, Agent, or Firm* — James P. Muraff; Neal, Gerber & Eisenberg LLP

(57) ABSTRACT

A system and method for dispensing an article from an article dispensing machine by reducing the amount of time for completing a transaction involving the article is provided. A request related to a selected article and payment information for a balance related to the selected article may be received at the article dispensing machine through a user interface. The payment information may be validated, and simultaneously and in parallel, the selected article may be retrieved from a storage unit in the article dispensing machine. The selected article may be dispensed from the article dispensing machine if the payment information is valid. If the payment information is not valid, the selected article may be returned to the storage unit. Quicker dispensing of articles during consumer transactions with the article dispensing machine may result. The articles may include media articles, such as DVDs, Blu-Ray discs, and video game discs.

34 Claims, 7 Drawing Sheets

(56) References Cited

U.S. PATENT DOCUMENTS

| | | |
|---|---|---|
| 3,826,344 A | 7/1974 | Wahlberg |
| 3,831,807 A | 8/1974 | Deaton et al. |
| 3,946,220 A | 3/1976 | Brobeck et al. |
| 3,964,577 A | 6/1976 | Bengtsson |
| 4,043,483 A | 8/1977 | Gore et al. |
| 4,073,368 A | 2/1978 | Mustapick |
| 4,300,040 A | 11/1981 | Gould et al. |
| 4,306,219 A | 12/1981 | Main et al. |
| 4,348,551 A | 9/1982 | Nakatani et al. |
| 4,369,422 A | 1/1983 | Rasmussen et al. |
| 4,369,442 A | 1/1983 | Werth et al. |
| 4,385,366 A | 5/1983 | Housey, Jr. |
| 4,388,689 A | 6/1983 | Hayman et al. |
| 4,396,985 A | 8/1983 | Ohara et al. |
| 4,414,467 A | 11/1983 | Gould et al. |
| 4,415,065 A | 11/1983 | Sandstedt et al. |
| 4,449,186 A | 5/1984 | Kelly et al. |
| 4,458,802 A | 7/1984 | Maciver et al. |
| 4,519,522 A | 5/1985 | McElwee |
| 4,530,067 A | 7/1985 | Dorr et al. |
| 4,547,851 A | 10/1985 | Kurland et al. |
| 4,553,222 A | 11/1985 | Kurland et al. |
| 4,567,359 A | 1/1986 | Lockwood et al. |
| 4,569,421 A | 2/1986 | Sandstedt |
| RE32,115 E | 4/1986 | Lockwood et al. |
| 4,598,810 A | 7/1986 | Shore et al. |
| 4,649,481 A | 3/1987 | Takahashi et al. |
| 4,650,977 A | 3/1987 | Couch et al. |
| 4,668,150 A | 5/1987 | Blumberg |
| 4,669,596 A | 6/1987 | Capers et al. |
| 4,675,515 A | 6/1987 | Lucero et al. |
| 4,706,794 A | 11/1987 | Awane et al. |
| 4,722,053 A | 1/1988 | Dubno et al. |
| 4,723,212 A | 2/1988 | Mindrum et al. |
| 4,734,005 A | 3/1988 | Blumberg |
| 4,766,548 A | 8/1988 | Cedrone et al. |
| 4,767,917 A | 8/1988 | Ushikubo et al. |
| 4,775,935 A | 10/1988 | Yourick |
| 4,778,983 A | 10/1988 | Ushikubo et al. |
| 4,789,045 A | 12/1988 | Pugh et al. |
| 4,789,054 A | 12/1988 | Shore et al. |
| 4,797,818 A | 1/1989 | Cotter |
| 4,812,629 A | 3/1989 | O'Neil et al. |
| 4,812,985 A | 3/1989 | Hambrick et al. |
| 4,814,592 A | 3/1989 | Bradt et al. |
| 4,814,985 A | 3/1989 | Swistak et al. |
| 4,821,917 A | 4/1989 | Brown |
| 4,825,045 A | 4/1989 | Humble et al. |
| 4,839,505 A | 6/1989 | Bradt et al. |
| 4,839,507 A | 6/1989 | May |
| 4,847,764 A | 7/1989 | Halvorson |
| 4,858,743 A | 8/1989 | Paraskevakos et al. |
| 4,860,876 A | 8/1989 | Moore et al. |
| 4,866,661 A | 9/1989 | de Prins et al. |
| 4,882,475 A | 11/1989 | Miller et al. |
| 4,893,705 A | 1/1990 | Brown |
| 4,893,727 A | 1/1990 | Near |
| 4,896,024 A | 1/1990 | Morello et al. |
| 4,903,815 A | 2/1990 | Hirschfeld et al. |
| 4,915,205 A | 4/1990 | Reid et al. |
| D308,052 S | 5/1990 | Darden et al. |
| 4,941,841 A | 7/1990 | Darden et al. |
| 4,945,428 A | 7/1990 | Waldo et al. |
| 4,947,028 A | 8/1990 | Gorog |
| 4,959,686 A | 9/1990 | Spallone et al. |
| 4,967,403 A | 10/1990 | Ogawa et al. |
| 4,967,906 A | 11/1990 | Morello et al. |
| 4,982,346 A | 1/1991 | Girouard et al. |
| 4,991,739 A | 2/1991 | Levasseur |
| 4,995,498 A | 2/1991 | Menke |
| 5,007,518 A | 4/1991 | Crooks et al. |
| 5,012,077 A | 4/1991 | Takano et al. |
| 5,013,897 A | 5/1991 | Harman et al. |
| 5,019,699 A | 5/1991 | Koenck et al. |
| 5,020,958 A | 6/1991 | Tuttobene et al. |
| 5,028,766 A | 7/1991 | Shah et al. |
| 5,042,686 A | 8/1991 | Stucki |
| 5,077,462 A | 12/1991 | Newell et al. |
| 5,077,607 A | 12/1991 | Johnson et al. |
| 5,085,308 A | 2/1992 | Wilhelm |
| 5,088,586 A | 2/1992 | Isobe et al. |
| 5,091,713 A | 2/1992 | Horne et al. |
| 5,095,195 A | 3/1992 | Harman et al. |
| 5,105,069 A | 4/1992 | Hakenewerth et al. |
| 5,128,862 A | 7/1992 | Mueller et al. |
| 5,133,441 A | 7/1992 | Brown |
| 5,139,384 A | 8/1992 | Tuttobene et al. |
| 5,143,193 A | 9/1992 | Geraci |
| 5,159,560 A | 10/1992 | Newell et al. |
| 5,205,436 A | 4/1993 | Savage |
| 5,206,814 A | 4/1993 | Cahlander et al. |
| 5,207,784 A | 5/1993 | Schwartzendruber et al. |
| 5,210,387 A * | 5/1993 | Smith .................... A21B 1/245 219/679 |
| 5,212,649 A | 5/1993 | Pelletier et al. |
| 5,235,509 A | 8/1993 | Mueller et al. |
| RE34,369 E | 9/1993 | Darden et al. |
| 5,273,183 A | 12/1993 | Tuttobene et al. |
| 5,313,392 A | 5/1994 | Temma et al. |
| 5,313,393 A | 5/1994 | Varley et al. |
| 5,319,705 A | 6/1994 | Halter |
| 5,323,327 A | 6/1994 | Carmichael et al. |
| 5,353,219 A | 10/1994 | Mueller et al. |
| 5,383,111 A | 1/1995 | Homma et al. |
| 5,385,265 A | 1/1995 | Schlamp et al. |
| 5,408,417 A | 4/1995 | Wilder |
| 5,409,092 A | 4/1995 | Itako et al. |
| 5,418,713 A | 5/1995 | Allen et al. |
| 5,442,568 A | 8/1995 | Ostendorf et al. |
| 5,445,295 A | 8/1995 | Brown et al. |
| 5,450,584 A | 9/1995 | Sekiguchi et al. |
| 5,450,938 A | 9/1995 | Rademacher et al. |
| 5,467,892 A | 11/1995 | Schlamp et al. |
| 5,482,139 A | 1/1996 | Rivalto et al. |
| 5,484,988 A | 1/1996 | Hills et al. |
| 5,499,707 A | 3/1996 | Steury |
| 5,504,675 A | 4/1996 | Cragun et al. |
| 5,510,979 A | 4/1996 | Moderi et al. |
| 5,513,116 A | 4/1996 | Buckley et al. |
| 5,546,316 A | 8/1996 | Buckley et al. |
| 5,550,746 A | 8/1996 | Jacobs |
| 5,555,143 A | 9/1996 | Hinnen et al. |
| 5,559,714 A | 9/1996 | Banks et al. |
| 5,561,604 A | 10/1996 | Buckley et al. |
| 5,576,951 A | 11/1996 | Lockwood |
| 5,594,791 A | 1/1997 | Szlam et al. |
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls et al. |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan et al. |
| 5,715,403 A | 2/1998 | Stefik et al. |
| 5,724,069 A | 3/1998 | Chen et al. |
| 5,724,521 A | 3/1998 | Dedrick et al. |
| 5,732,398 A | 3/1998 | Tagawa et al. |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs et al. |
| 5,769,269 A | 6/1998 | Peters et al. |
| 5,777,884 A | 7/1998 | Belka et al. |
| 5,790,677 A | 8/1998 | Fox et al. |
| 5,806,071 A | 9/1998 | Balderrama et al. |
| 5,822,216 A | 10/1998 | Satchell et al. |
| 5,822,291 A | 10/1998 | Brindze et al. |
| 5,831,862 A | 11/1998 | Hetrick et al. |

(56) References Cited

U.S. PATENT DOCUMENTS

| | | |
|---|---|---|
| 5,832,503 A | 11/1998 | Malik et al. |
| 5,850,442 A | 12/1998 | Muftic et al. |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell et al. |
| 5,898,594 A | 4/1999 | Leason et al. |
| 5,900,608 A | 5/1999 | Iida et al. |
| 5,905,246 A | 5/1999 | Fajkowski |
| 5,923,016 A | 7/1999 | Fredregill et al. |
| 5,930,771 A | 7/1999 | Stapp et al. |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,943,423 A | 8/1999 | Muftic et al. |
| 5,950,173 A | 9/1999 | Perkowski et al. |
| 5,954,797 A | 9/1999 | Sidey et al. |
| 5,956,694 A | 9/1999 | Powell et al. |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott et al. |
| 5,988,346 A | 11/1999 | Tedesco et al. |
| 5,988,431 A | 11/1999 | Roe |
| 5,997,170 A | 12/1999 | Brodbeck et al. |
| 6,002,395 A | 12/1999 | Wagner et al. |
| 6,014,137 A | 1/2000 | Burns et al. |
| 6,029,851 A | 2/2000 | Jenkins et al. |
| 6,039,244 A | 3/2000 | Finsterwald |
| 6,044,362 A | 3/2000 | Neely et al. |
| 6,047,338 A | 4/2000 | Grolemund et al. |
| 6,050,448 A | 4/2000 | Willis |
| 6,056,194 A | 5/2000 | Kolls et al. |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata et al. |
| 6,119,934 A | 9/2000 | Kolls et al. |
| 6,123,223 A | 9/2000 | Watkins |
| 6,125,353 A | 9/2000 | Yagasaki |
| 6,126,036 A | 10/2000 | d'Alayer de Costemore d'Arc et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg, Jr. et al. |
| 6,466,830 B1 | 10/2002 | Manross |
| 6,477,503 B1 | 11/2002 | Mankes |
| 6,490,502 B2 | 12/2002 | Fellows et al. |
| 6,493,110 B1 | 12/2002 | Roberts |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B2 | 8/2005 | Fajkowski |
| 6,954,732 B1 | 10/2005 | DeLapa et al. |
| 6,959,285 B2 | 10/2005 | Stefanik et al. |
| 6,959,286 B2 | 10/2005 | Perkowski |
| 6,965,869 B1 | 11/2005 | Tomita et al. |
| 6,968,365 B2 | 11/2005 | Hollström et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |
| 7,024,390 B1 | 4/2006 | Mori et al. |
| 7,043,497 B1 | 5/2006 | Carty et al. |
| 7,053,773 B2 | 5/2006 | McGarry et al. |

(56) References Cited

U.S. PATENT DOCUMENTS

| | | |
|---|---|---|
| 7,058,581 B1 | 6/2006 | Young |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,085,556 B2 | 8/2006 | Offer |
| 7,085,727 B2 | 8/2006 | VanOrman |
| 7,108,180 B2 | 9/2006 | Brusso et al. |
| 7,139,731 B1 | 11/2006 | Alvin |
| 7,167,842 B1 | 1/2007 | Josephson, II et al. |
| 7,167,892 B2 | 1/2007 | Defossé et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,233,916 B2 | 6/2007 | Schultz |
| 7,234,609 B2 | 6/2007 | DeLazzer et al. |
| 7,236,946 B2 | 6/2007 | Bates et al. |
| 7,240,805 B2 | 7/2007 | Chirnomas |
| 7,240,843 B2 | 7/2007 | Paul et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,571,139 B1 * | 8/2009 | Giordano ............... G06Q 20/04 705/37 |
| 7,584,869 B2 | 9/2009 | DeLazzer et al. |
| 7,747,346 B2 | 6/2010 | Lowe et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,853,354 B2 | 12/2010 | Kuehnrich et al. |
| 7,853,600 B2 | 12/2010 | Herz et al. |
| 7,860,606 B2 | 12/2010 | Rudy |
| 7,988,049 B2 | 8/2011 | Kuehnrich |
| 8,060,249 B2 | 11/2011 | Bear et al. |
| 8,235,247 B2 | 8/2012 | Alvarez |
| 8,352,449 B1 | 1/2013 | Parekh et al. |
| 8,369,987 B2 * | 2/2013 | Claessen ............... G06Q 20/123 700/232 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 | 9/2002 | Jenkins et al. |
| 2002/0133269 A1 | 9/2002 | Anselmi |
| 2002/0152123 A1 * | 10/2002 | Giordano ............... G06Q 20/04 705/14.33 |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |
| 2003/0004828 A1 | 1/2003 | Epstein |
| 2003/0009408 A1 | 1/2003 | Korin |
| 2003/0023453 A1 | 1/2003 | Hafen et al. |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149510 A1 | 8/2003 | Takahashi |
| 2003/0163382 A1 | 8/2003 | Stefanik et al. |
| 2003/0163399 A1 | 8/2003 | Harper et al. |
| 2003/0167231 A1 | 9/2003 | Winking et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 | 4/2004 | Messenger et al. |
| 2004/0133466 A1 | 7/2004 | Redmond et al. |
| 2004/0133653 A1 | 7/2004 | Defosse et al. |
| 2004/0139173 A1 | 7/2004 | Karaoguz et al. |
| 2004/0153413 A1 | 8/2004 | Gross |
| 2004/0158503 A1 | 8/2004 | Gross |
| 2004/0158504 A1 | 8/2004 | Gross |
| 2004/0158871 A1 | 8/2004 | Jacobson |
| 2004/0162633 A1 | 8/2004 | Kraft |
| 2004/0162783 A1 | 8/2004 | Gross |
| 2004/0172274 A1 | 9/2004 | Gross |
| 2004/0172275 A1 | 9/2004 | Gross |
| 2004/0172342 A1 | 9/2004 | Gross |
| 2004/0243478 A1 * | 12/2004 | Walker ............... G06Q 10/087 705/26.1 |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1 | 2/2005 | Knowles et al. |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0197855 A1 | 9/2005 | Nudd |
| 2005/0216120 A1 | 9/2005 | Rosenberg |
| 2005/0230410 A1 | 10/2005 | DeLazzer et al. |
| 2005/0230473 A1 | 10/2005 | Fajkowski |
| 2005/0234911 A1 | 10/2005 | Hess et al. |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0108414 A1 * | 5/2006 | Sorenson ............... G06Q 20/18 235/381 |
| 2006/0122881 A1 | 6/2006 | Walker et al. |
| 2006/0149685 A1 | 7/2006 | Gross |
| 2006/0155575 A1 | 7/2006 | Gross |
| 2006/0184395 A1 | 8/2006 | Millwee |

(56) References Cited

U.S. PATENT DOCUMENTS

| | | |
|---|---|---|
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |
| 2006/0231613 A1 | 10/2006 | Walker et al. |
| 2006/0231614 A1 | 10/2006 | Walker et al. |
| 2006/0235746 A1 | 10/2006 | Hammond et al. |
| 2006/0235747 A1 | 10/2006 | Hammond et al. |
| 2006/0241966 A1 | 10/2006 | Walker et al. |
| 2006/0241967 A1 | 10/2006 | Gross |
| 2006/0242059 A1 | 10/2006 | Hansen |
| 2006/0247823 A1 | 11/2006 | Boucher |
| 2006/0247824 A1 | 11/2006 | Walker et al. |
| 2006/0254832 A1 | 11/2006 | Strong |
| 2006/0254862 A1 | 11/2006 | Hoersten |
| 2006/0259188 A1* | 11/2006 | Berg ............... A61J 7/0084 700/231 |
| 2006/0259190 A1 | 11/2006 | Hale |
| 2006/0259191 A1 | 11/2006 | Lowe |
| 2006/0259192 A1 | 11/2006 | Lowe et al. |
| 2006/0265101 A1 | 11/2006 | Kaplan et al. |
| 2006/0265286 A1 | 11/2006 | Evangelist et al. |
| 2006/0266823 A1 | 11/2006 | Passen et al. |
| 2006/0272922 A1 | 12/2006 | Hoersten et al. |
| 2006/0273152 A1 | 12/2006 | Fields |
| 2007/0005438 A1 | 1/2007 | Evangelist et al. |
| 2007/0011093 A1 | 1/2007 | Tree |
| 2007/0011903 A1 | 1/2007 | Chang |
| 2007/0050083 A1 | 3/2007 | Signorelli et al. |
| 2007/0050256 A1 | 3/2007 | Walker et al. |
| 2007/0050266 A1 | 3/2007 | Barber et al. |
| 2007/0051802 A1 | 3/2007 | Barber et al. |
| 2007/0063020 A1 | 3/2007 | Barrafato |
| 2007/0063027 A1 | 3/2007 | Belfer et al. |
| 2007/0067429 A1 | 3/2007 | Jain et al. |
| 2007/0084872 A1 | 4/2007 | Hair et al. |
| 2007/0084917 A1 | 4/2007 | Fajkowski |
| 2007/0094245 A1 | 4/2007 | Vigil |
| 2007/0095901 A1 | 5/2007 | Illingworth |
| 2007/0125104 A1 | 6/2007 | Ehlers |
| 2007/0130020 A1 | 6/2007 | Paolini |
| 2007/0136247 A1 | 6/2007 | Vigil |
| 2007/0156442 A1 | 7/2007 | Ali |
| 2007/0156578 A1 | 7/2007 | Perazolo |
| 2007/0162183 A1 | 7/2007 | Pinney et al. |
| 2007/0162184 A1 | 7/2007 | Pinney et al. |
| 2007/0169132 A1 | 7/2007 | Blust et al. |
| 2007/0175986 A1 | 8/2007 | Petrone et al. |
| 2007/0179668 A1 | 8/2007 | Mellin |
| 2007/0185776 A1 | 8/2007 | Nguyen et al. |
| 2007/0210153 A1 | 9/2007 | Walker et al. |
| 2007/0213871 A1 | 9/2007 | Whitten et al. |
| 2007/0276537 A1* | 11/2007 | Walker ............... G06Q 30/02 700/238 |
| 2008/0005025 A1 | 1/2008 | Legere et al. |
| 2008/0027835 A1 | 1/2008 | LeMasters et al. |
| 2008/0040211 A1 | 2/2008 | Walker et al. |
| 2008/0125906 A1 | 5/2008 | Bates et al. |
| 2008/0222690 A1 | 9/2008 | Kim |
| 2008/0239961 A1 | 10/2008 | Hilerio et al. |
| 2008/0275591 A1 | 11/2008 | Chirnomas |
| 2009/0018792 A1 | 1/2009 | Kuehnrich |
| 2009/0030931 A1 | 1/2009 | Khivesara et al. |
| 2009/0048932 A1 | 2/2009 | Barber |
| 2009/0089187 A1* | 4/2009 | Hoersten ............ G06Q 10/087 705/28 |
| 2009/0113116 A1 | 4/2009 | Thompson et al. |
| 2009/0162184 A1* | 6/2009 | Duncan ............... G07F 19/206 414/800 |
| 2009/0248199 A1* | 10/2009 | Milhorn ............. B01F 13/1055 700/239 |
| 2009/0299824 A1 | 12/2009 | Barnes, Jr. |
| 2010/0010964 A1 | 1/2010 | Skowronek et al. |
| 2010/0036808 A1 | 2/2010 | Lee |
| 2010/0042577 A1 | 2/2010 | Rinearson |
| 2010/0057871 A1 | 3/2010 | Kaplan et al. |
| 2010/0093324 A1 | 4/2010 | Gupta et al. |
| 2010/0153983 A1 | 6/2010 | Philmon et al. |
| 2010/0198400 A1 | 8/2010 | Pascal et al. |
| 2010/0274624 A1 | 10/2010 | Rochford et al. |
| 2010/0312380 A1 | 12/2010 | Lowe et al. |
| 2010/0314405 A1 | 12/2010 | Alvarez |
| 2010/0318219 A1 | 12/2010 | Kuehnrich et al. |
| 2011/0004536 A1 | 1/2011 | Hoersten et al. |
| 2011/0047010 A1* | 2/2011 | Arnold ............... G06Q 30/02 705/14.1 |
| 2011/0060454 A1 | 3/2011 | Lowe et al. |
| 2011/0060456 A1 | 3/2011 | Lowe et al. |
| 2011/0093329 A1 | 4/2011 | Bodor et al. |
| 2011/0103609 A1 | 5/2011 | Pelland et al. |
| 2011/0107374 A1 | 5/2011 | Roberts et al. |
| 2011/0130873 A1 | 6/2011 | Yepez et al. |
| 2011/0131652 A1 | 6/2011 | Robinson et al. |
| 2011/0145033 A1 | 6/2011 | Kuehnrich et al. |
| 2011/0153060 A1 | 6/2011 | Yepez et al. |
| 2011/0153067 A1 | 6/2011 | Weinshenker |
| 2011/0153071 A1 | 6/2011 | Claessen |
| 2011/0238194 A1 | 9/2011 | Rosenberg |
| 2011/0238296 A1 | 9/2011 | Purks et al. |
| 2012/0311633 A1 | 12/2012 | Mandrekar et al. |
| 2013/0046707 A1 | 2/2013 | Maskatia et al. |
| 2013/0060648 A1 | 3/2013 | Maskatia et al. |

FOREIGN PATENT DOCUMENTS

| | | |
|---|---|---|
| DE | 35 29 155 | 2/1987 |
| EP | 0060643 | 9/1982 |
| EP | 205691 | 12/1986 |
| EP | 0249367 | 12/1987 |
| EP | 572119 | 12/1993 |
| EP | 287367 | 10/1998 |
| EP | 986033 | 3/2000 |
| EP | 1367549 | 12/2003 |
| FR | 2549624 | 1/1985 |
| FR | 2559599 | 8/1985 |
| FR | 2562293 | 10/1995 |
| GB | 380926 | 9/1932 |
| GB | 2143662 | 2/1985 |
| GB | 2172720 | 9/1986 |
| GB | 2402242 | 12/2004 |
| JP | 55156107 | 12/1980 |
| JP | 56047855 | 4/1981 |
| JP | 02178795 | 7/1990 |
| JP | 03062189 | 3/1991 |
| JP | 03119496 | 5/1991 |
| JP | 10247982 | 9/1998 |
| JP | 00149136 | 3/2000 |
| JP | 02008129 | 1/2002 |
| JP | 03036328 | 2/2003 |
| JP | 04094857 | 3/2004 |
| JP | 09043143 | 2/2009 |
| KR | 1020030089154 | 11/2003 |
| KR | 1020040069053 | 8/2004 |
| KR | 1020050048100 | 5/2005 |
| KR | 1020060080175 | 7/2006 |
| KR | 1020070021301 | 2/2007 |
| KR | 1020110036410 | 4/2011 |
| WO | WO 87/00948 | 2/1987 |
| WO | WO 87/05425 | 9/1987 |
| WO | WO 88/04085 | 6/1988 |
| WO | WO 93/00644 | 1/1993 |
| WO | WO 88/06771 | 9/1998 |
| WO | WO 99/24902 | 5/1999 |
| WO | WO 00/38120 | 6/2000 |
| WO | WO 00/72160 | 11/2000 |
| WO | WO 0225552 A2 * | 3/2002 |
| WO | WO 02/29708 | 4/2002 |
| WO | WO 2004/070646 | 8/2004 |
| WO | WO 2005/062887 | 7/2005 |
| WO | WO 2006/112817 | 10/2006 |
| WO | WO 2006/116108 | 11/2006 |
| WO | WO 2006/116109 | 11/2006 |
| WO | WO 2006/116110 | 11/2006 |

(56) References Cited

FOREIGN PATENT DOCUMENTS

| WO | WO 2006/116112 | 11/2006 |
|----|----------------|---------|
| WO | WO 2006/116113 | 11/2006 |
| WO | WO 2006/116114 | 11/2006 |
| WO | WO 2006/116115 | 11/2006 |
| WO | WO 2006/116116 | 11/2006 |
| WO | WO 2011/022689 | 2/2011 |
| WO | WO 2011/028727 | 3/2011 |
| WO | WO 2011/028728 | 3/2011 |
| WO | WO 2011/031532 | 3/2011 |
| WO | WO 2013043753 A2 * | 3/2013 |

OTHER PUBLICATIONS

International Preliminary Report on Patentability for Application PCT/US2005/12563 dated Apr. 7, 20106.
Patent Cooperation Treaty International Search Report for Application PCT/US2006/15125 mailed Jan. 11, 2007.
International Preliminary Report on Patentability for Application PCT/US2006/15125 dated Jan. 11, 2007.
Patent Cooperation Treaty International Search Report for Application PCT/US2006/15131 mailed Jul. 7, 2008.
International Preliminary Report on Patentability for Application PCT/US2006/15131 dated Jun. 11, 2008.
Patent Cooperation Treaty International Search Report for Application PCT/US06/15130 mailed Nov. 22, 2006.
International Preliminary Report on Patentability for Application PCT/US06/15130 dated Apr. 23, 2007.
Patent Cooperation Treaty International Search Report for Application PCT/US06/15132 mailed May 10, 2007.
International Preliminary Report on Patentability for Application PCT/US06/15132 dated Nov. 17, 2007.
Patent Cooperation Treaty International Search Report for Application PCT/US06/15127 mailed Jun. 19, 2008.
International Preliminary Report on Patentability for Application PCT/US06/15127 dated Mar. 10, 2009.
Patent Cooperation Treaty International Search Report for Application PCT/US06/15129 mailed Sep. 20, 2006.
International Preliminary Report on Patentability for Application PCT/US06/15129 dated Oct. 23, 2007.
Patent Cooperation Treaty International Search Report for Application PCT/US06/15126 mailed Apr. 30, 2008.
International Preliminary Report on Patentability for Application PCT/US06/15126 dated Mar. 10, 2009.
Patent Cooperation Treaty International Search Report for Application PCT/US06/15133 mailed Jun. 6, 2007.
International Preliminary Report on Patentability for Application PCT/US06/15133 dated Oct. 23, 2007.
Patent Cooperation Treaty International Search Report for Application PCT/US2010/046872 mailed Mar. 29, 2011.
International Preliminary Report on Patentability for Application PCT/US2010/046872 dated Sep. 7, 2011.
Patent Cooperation Treaty International Search Report for Application US2010/046219 mailed Feb. 28, 2011.
International Preliminary Report on Patentability for Application US2010/046219 dated Feb. 21, 2012.
Patent Cooperation Treaty International Search Report for Application US2010/047374 mailed May 2, 2011.
International Preliminary Report on Patentability for Application US2010/047374 dated Mar. 6, 2012.
Patent Cooperation Treaty International Search Report for Application US2010/047371 mailed Apr. 29, 2011.
International Preliminary Report on Patentability for Application US2010/047371 dated Mar. 6, 2012.
Patent Cooperation Treaty International Search Report for Application US2012/024900 mailed Oct. 19, 2012.
International Preliminary Report on Patentability for Application US2012/024900 dated Aug. 21, 2013.
Patent Cooperation Treaty International Search Report for Application US2010/050339 mailed Feb. 29, 2012.
International Preliminary Report on Patentability for Application US2010/050339 dated Mar. 5, 2013.
Patent Cooperation Treaty International Search Report for Application US2011/48686 mailed Apr. 9, 2012.
International Preliminary Report on Patentability for Application US2011/48686 dated Feb. 28, 2013.
Patent Cooperation Treaty International Search Report for Application US2012/42329 mailed Feb. 22, 2013.
Supplementary Search Report mailed Jan. 21, 2009 for European Patent Application EP05736275.
Examination Report for EP 05736275.8 mailed May 15, 2009.
1982 Issue Rolling Stones Magazine, Film Rentals by Vending Machine.
1984 Picture of U.S. Installation of Japanese Manufactured VHS Rental Kiosk.
International Search Report and Written Opinion for PCT Application No. PCT/US13/44184 mailed Sep. 13, 2013.

* cited by examiner

SYSTEM AND METHOD FOR SIMULTANEOUS ARTICLE RETRIEVAL AND TRANSACTION VALIDATION

TECHNICAL FIELD

This invention relates to a system and method for simultaneous article retrieval and transaction validation in an article dispensing machine. More particularly, the invention provides a system and method for retrieving a selected article from a storage unit of an article dispensing machine in parallel with determining whether payment information for a balance related to the selected article is valid.

BACKGROUND AND SUMMARY OF THE INVENTION

While the invention is often described herein with reference to a digital video disc, Blu-Ray disc, and video game distribution system, an application to which the invention is advantageously suited, it will be readily apparent that the invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the invention can function as an article dispensing machine-based distribution system that will typically have multiple units of each new release per article dispensing machine. The dispensing machines of the U.S. Pat. No. 7,234,609 and the invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours (e.g., 24 hours a day, 7 days a week). The invention employs a more cost-effective, convenient platform than brick-and-mortar stores. In addition, with the invention, dispensing machines can be situated in retail locations having high foot traffic, such as at a popular grocery store, restaurant, drug store, and/or other popular retail location.

The dispensing machine of the U.S. Pat. No. 7,234,609 and the invention can be operated at a substantial savings over the costs associated with traditional brick-and-mortar video rental stores. For example, the invention does not require hourly employees to continuously man the dispensing machines or restock them with inventories.

Unlike brick-and-mortar stores, the dispensing machine of the U.S. Pat. No. 7,234,609 and the invention does not require an on-site store manager because all operational decisions can be made at a centralized location by a management team officed remote from the retail locations. Unlike brick-and-mortar stores, the dispensing machine of the U.S. Pat. No. 7,234,609 and the invention does not require significant physical space. Unlike brick-and-mortar stores, the dispensing machine of the U.S. Pat. No. 7,234,609 and the invention has low operating costs because heating or air conditioning is not necessarily required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the invention is a fully automated, integrated DVD, Blu-Ray, and video game rental and/or purchase systems. It may incorporate robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application. These technologies and others fill long-felt needs in the art and give advantages over conventional video distribution options. The dispensing machine of the U.S. Pat. No. 7,234,609 and the invention functions as much as a promotional platform as it does a rental kiosk.

By utilizing the dispensing machines and the fully-interactive, real-time, linked Internet website or mobile/consumer electronics device applications, consumers can rent one or more DVDs, Blu-Ray discs, video games, or other entertainment content directly from dispensing machines as well as indirectly by making a rental reservation through the website or application for later pickup at a conveniently located machine. These dispensing machines may be networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

The invention allows for dispensing a selected article of a plurality of articles from an article dispensing machine by reducing the amount of time for completing a transaction involving the selected article. A request related to the selected article and payment information for a balance related to the selected article may be received. The request may include at least a rental transaction request or a purchase transaction request. It may be determined whether the payment information is valid, such as whether a payment card is authorized or whether credits are available for redemption. The selected article may be retrieved from a storage unit in the article dispensing machine simultaneously with determining whether the payment information is valid. If the payment information is valid, the selected article may be dispensed from the article dispensing machine and quicker dispensing of the selected article. However, if the payment information is not valid, the selected article may be returned to the storage unit.

The invention has the advantage of quicker dispensing of articles from the article dispensing machine to a consumer because the validation of payment information is executed in parallel with the retrieval of the selected article from the storage unit. Consumer interaction with the article dispensing machine may be improved and more pleasing due to the reduced transaction time. Moreover, the revenue for an article dispensing machine may increase because more transactions are possible due to reduced individual transaction times. Other features and advantages are provided by the following description and drawings.

DETAILED DESCRIPTION OF THE INVENTION

Figure 1:
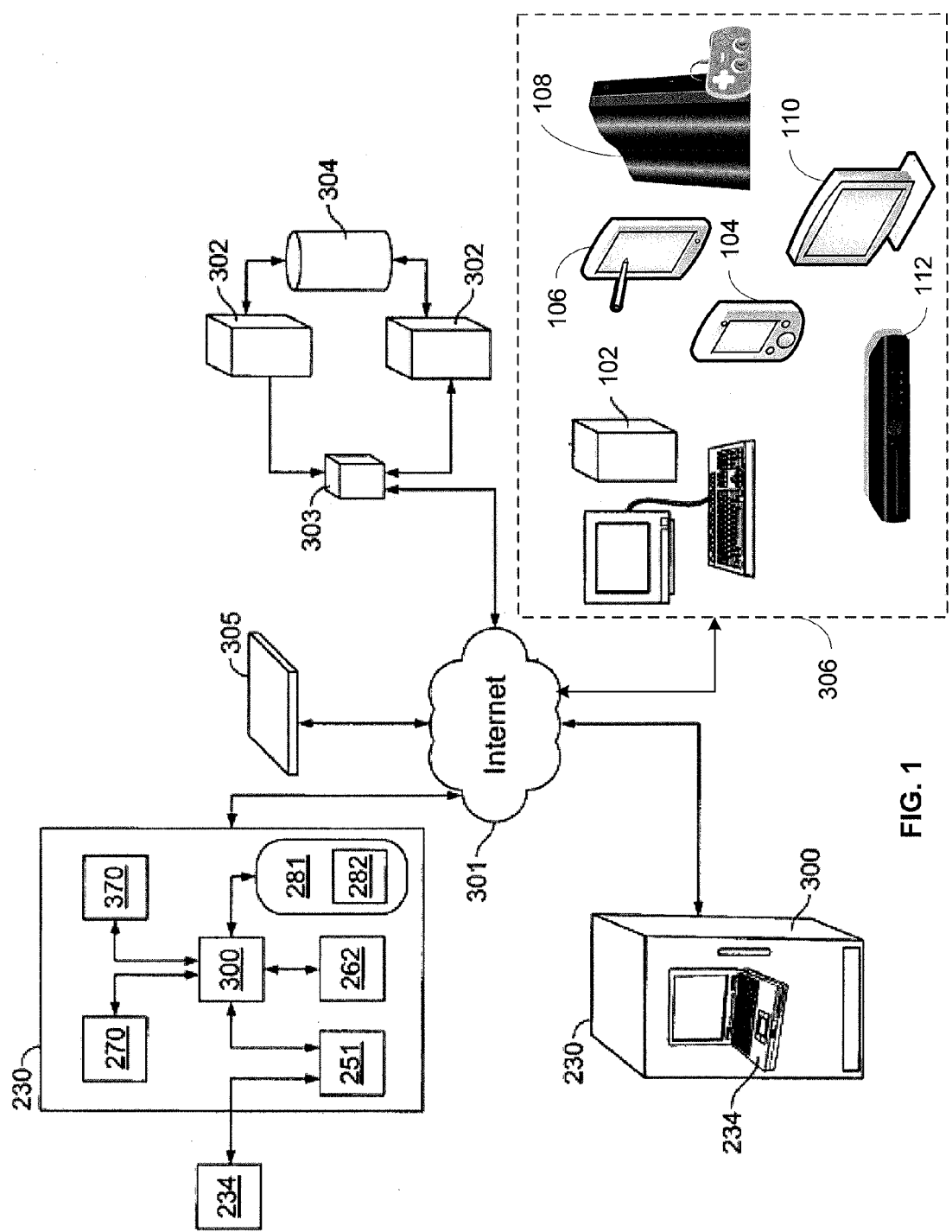
FIG. 1 is an illustration of a system for communicating and processing information in a network of article dispensing machines and dispensing apparatus.

While this invention is susceptible of embodiments in many different forms, there is shown in the drawings and will herein be described in detail embodiments of the invention with the understanding that the present disclosure is to be considered as an exemplification of the principles of the invention and is not intended to limit the broad aspect of the invention to the embodiments illustrated.

FIGS. 1-5 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system may form a network. As such, those machines may be in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 may comprise a network of machines in communication with one another. As shown in FIG. 1, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Generally, in terms of hardware architecture, the central server 302 includes a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 would be understood by one of skill in the art and are encompassed within the scope of the invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the invention and the O/S, in whole or in part, but typically the latter, are read by processor, perhaps buffered within the processor, and then executed.

When the invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In one embodiment, the network communication equipment includes a network card such as an Ethernet card. In one network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while one embodiment of the invention is for article dispensing machine 230 to have a "broadband" connection to the network 301, the principles of the invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 may be located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information may also be stored in article dispensing machine database 282.

Central database 304 may be a relational database, although other types of database architectures may be used without departing from the principles of the invention. For example, the database 304 may be a SQL database, an Access database or an Oracle database, and in any such embodiment have the functionality stored herein. Central database 304 may also be capable of being shared, as illustrated, between a plurality of central controllers 302 and its information may also be capable of being transmitted via network 301. It will be understood that a variety of methods exist for serving the information stored in central database 304. In one embodiment, .net and Microsoft Reporting Services are employed, however, other technologies such as ODBC, MySQL, CFML and the like may be used.

The central controller 302 and central database 304 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302 and/or the central database 304 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 may comprise web server software such as IIS or Apache. It will be understood that a variety of web server software and web browser software exists to implement the principles of the invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302 and the central database 304 using rules and specifications of an application programming interface (API).

In one embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

Figure 2:
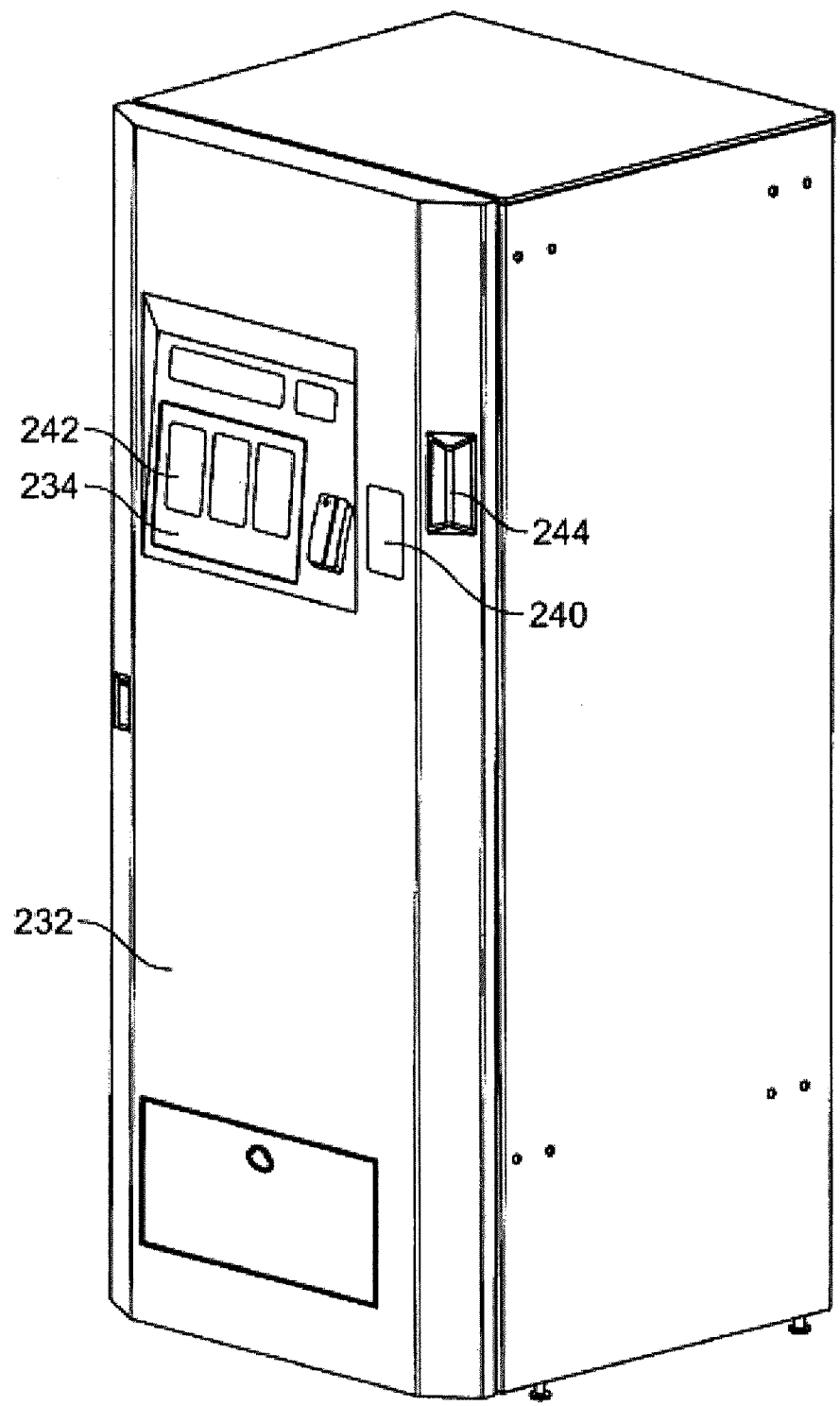
FIG. 2 is a perspective view of an article dispensing machine constructed in accordance with the principles of the invention.

As shown in FIG. 2, article dispensing machine 230 includes a machine housing 232 with front, rear, top, bottom and side panels. The machine housing 232 may be a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 may be designed in known fashion to read magnetically encoded membership and/or credit/debit cards for authorizing the distribution of articles of inventory through the article transfer opening 244. The card reader 240 may also include the ability to communicate with a smart chip, a near field communication tag, and/or a contactless chip of a membership, credit, or debit card. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection or can represent a reference number for use by the customer when contacting customer service, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also may include speaker units. Known audio technology may be incorporated within dispensing machine 230 to broadcast focused audio directed to relatively small (e.g., three square feet) locations in front of the machines from speaker units and/or in other designated locations at a retail site.

Figure 3:
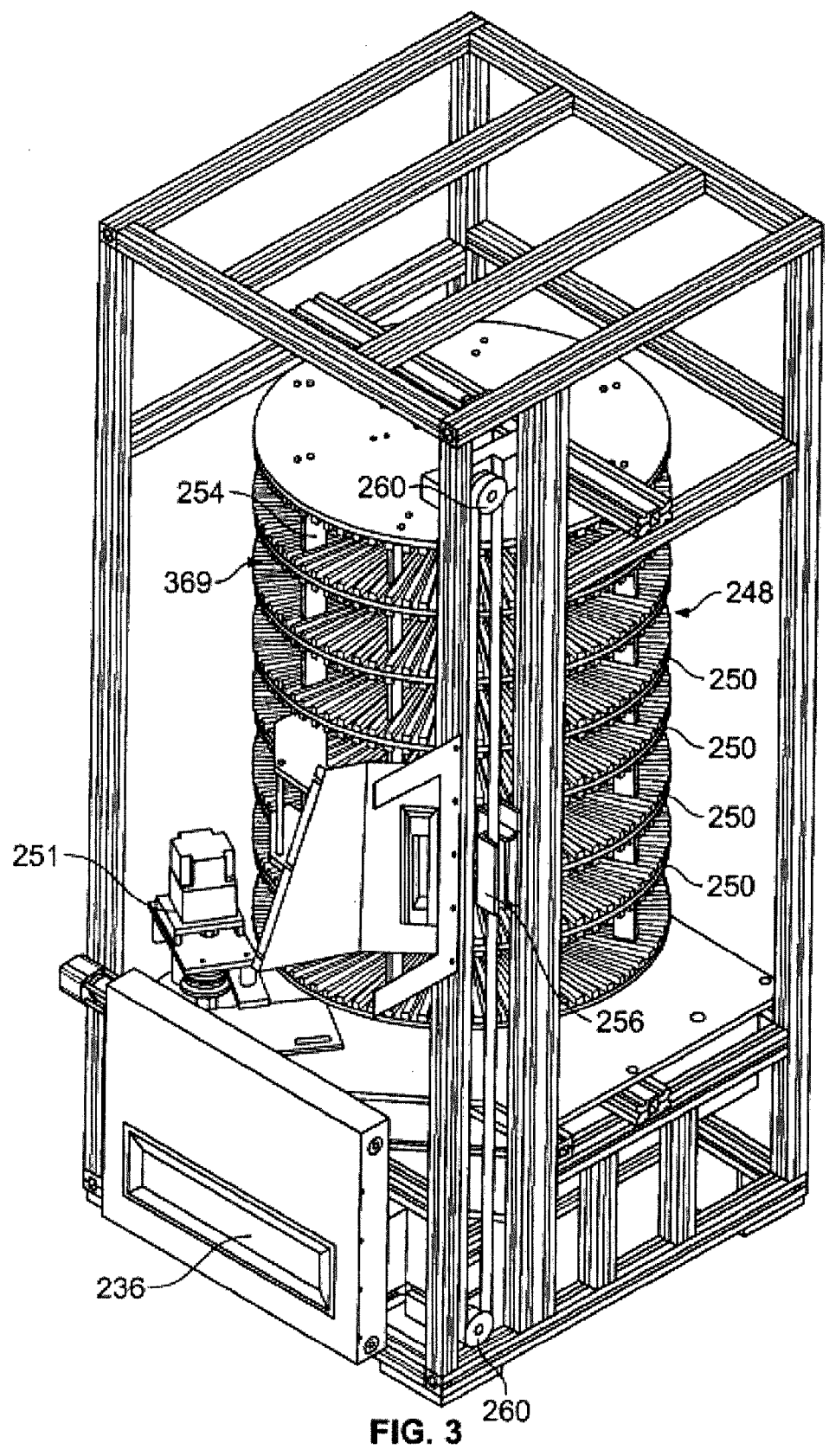
FIG. 3 is a partially open perspective view of the article dispensing machine of FIG. 2.

Referring now to FIG. 3 which shows the components positioned in the interior of dispensing machine 230, the article dispensing machine includes a non-removable storage unit 248 which may be a carousel-style, cylindrical storage facility having a plurality of compartmentalized rows defined by circular-shaped storage racks 250 sharing a common central axis. Each of the rows has a plurality of receiving slots or compartments 369. Each storage rack 250 includes radially extending, angularly separated compartment panels defining article storage compartments 369 which are designed to receive and retain flat-type pack articles, such as DVD, Blu-Ray disc, and video game disc cases, as desired. The compartment panels may be axially aligned to retain the opposing sides of DVD, Blu-Ray disc, and video game disc cases at the top and bottom ends thereof. In that regard, the DVD, Blu-Ray disc, and video game disc cases may be retained between successive vertical pairs of storage racks 250. The storage racks 250 are vertically spaced by axially extending support members 254.

Figure 4:
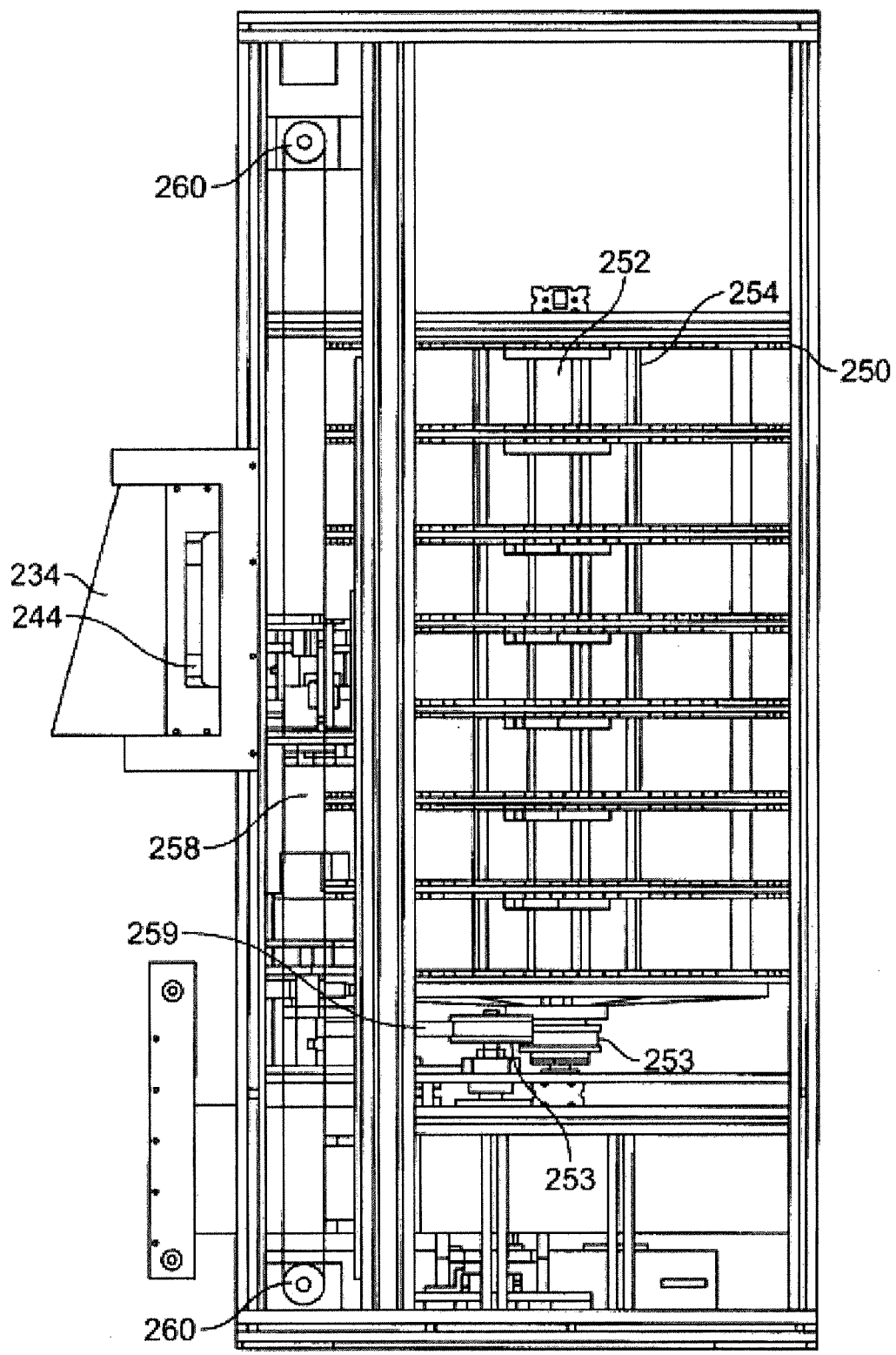
FIG. 4 is a partially open side elevational view of the article dispensing machine of FIG. 2.

A first motor 251, hereinafter referred to as the rotational motor, rotates the storage unit 248 about a vertical axis formed by the driven shaft 252. As shown in FIG. 4, rotational motor 251 drives a belt 259, which in turn rotates wheels 253 and shaft 252 to which the storage racks 250 are attached.

Figure 5:
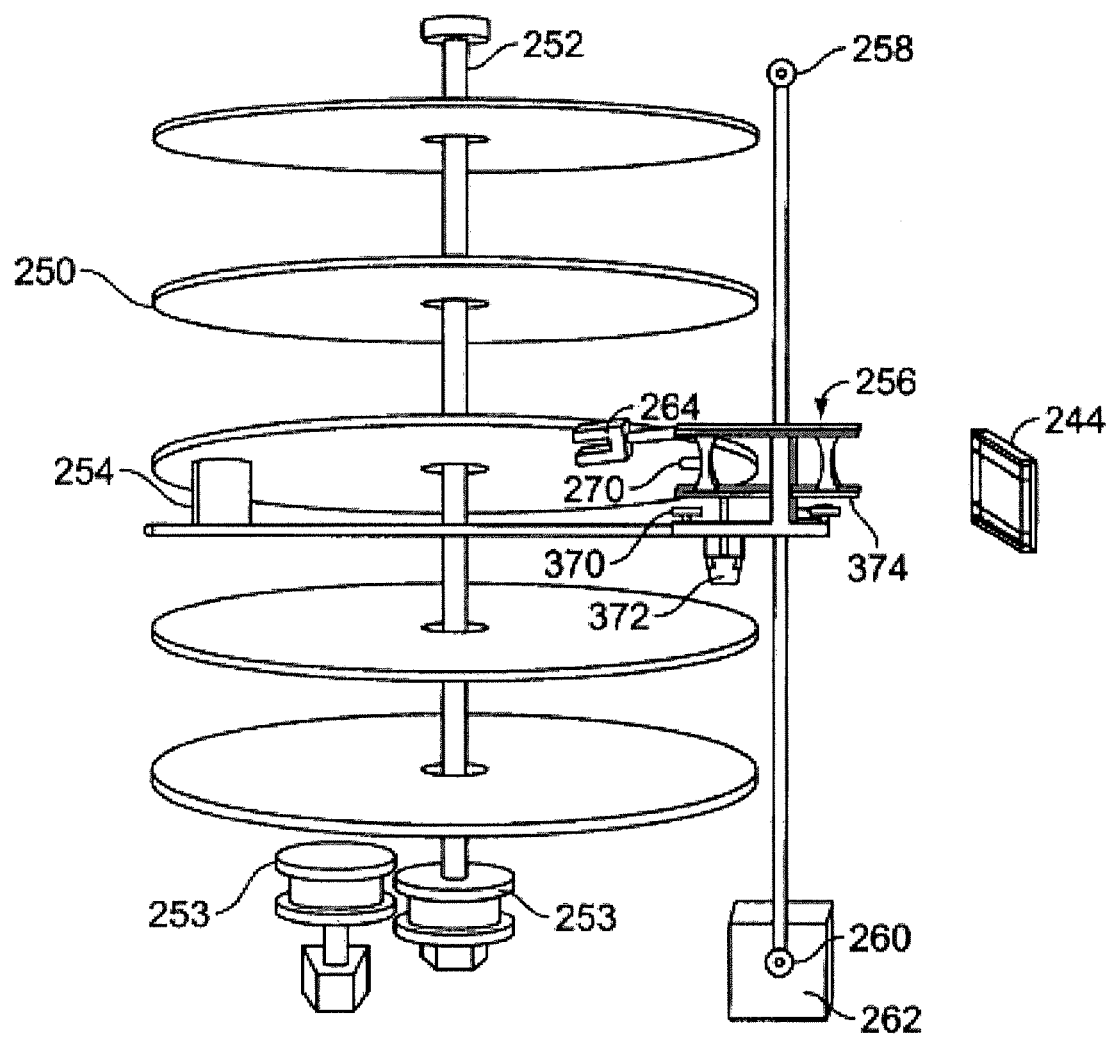
FIG. 5 is a partially open side elevational view of the view of the article dispensing machine of FIG. 2 with certain components removed for clarity.

As shown in FIGS. 3 and 5, a selector arm 256 is adjacent the storage unit 248. The selector arm 256 is connected to a conveying belt 258 carried by rollers 260, which may be positioned proximate to the top and the bottom of the article dispensing machine housing. At least one of the rollers 260 may be driven by a second motor 262, hereinafter referred to as the selector arm motor, to provide for vertical movement of selector arm 256 along a vertical axis generally parallel to the vertical axis of the storage device. Alternatively, the selector arm motor 262 may be positioned on the selector arm 256. In one embodiment, the motors 251, 262 are stepper motors that are capable of accurately controlling the movement and position of the compartmentalized storage unit 248 and the selector arm 256, respectively.

Referring now to FIG. 5, the vending apparatus 230 is equipped with a first sensor 270 for sensing objects stored in the inventory of the apparatus. The first sensor may be mounted on the selector arm 256. A variety of forms of sensors are practicable with the invention for use as the first sensor without departing from the principles thereof, including proximity sensors, proximity sensors, an optical laser scanner, a magnetic scanner, an optical bar code reader, an ultraviolet optical scanner, a radio frequency sensor and an infrared optical scanner. The vending apparatus 230 is further equipped with a second sensor 370 capable of reading information attached to the objects stored in the inventory of the apparatus. The second sensor 370 may be, as illustrated, mounted on the selector arm 256. A variety of forms of sensors are practicable with the invention for use as the second sensor without departing from the principles thereof, including an optical laser scanner, a magnetic scanner, an optical bar code reader, an ultraviolet optical scanner, a radio frequency sensor and an infrared optical scanner.

The selector arm 256 comprises a picker device 264 which is capable of removing a DVD, Blu-Ray disc, or video game disc from the compartments 369. The selector arm 256 may further comprise a conveyor belt 374, which contacts one of the media products in one of the compartments 369 and conveys the product to the article transfer opening 244 whereby it is delivered to a user on the exterior of the article dispensing machine 230. The conveyor 374 is driven by a conveyor motor 372.

A system and method for calibrating the selector arm controller is disclosed in commonly owned U.S. Patent Application, Publication No. 2006/0254832, which is herein incorporated by reference in its entirety.

Generally, during the normal operation of the article dispensing machine, each article of inventory dispensed from a dispensing machine may be scanned by the second sensor 370 and an electronic record is created indicating the consumer who rented and/or purchased the media. In addition, articles of inventory returned to a dispensing machine by a customer and inserted into the article transfer opening 244 thereof may be scanned by the second sensor 370 and identified by the dispensing machine (for example with a bar code reader or scanner in electronic communication with the dispensing machine controller, positioned proximate the media dispending/return opening) along with an identification of its later stored position on the storage device.

These electronic records can be shared among dispensing machines within a network thereof, and can also be shared with a centralized office via the Internet or any other electronic data communication link. These electronic records can be used to ensure that the inventory process is carried out efficiently and accurately.

The physical media article in an article dispensing machine 230 may include at least a DVD, Blu-Ray disc, video game disc, or other media article. Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. Communication with the central controller 302 may be interrupted if the load at the central controller 302 is above a certain threshold. For example, the central controller 302 may direct the article dispensing machine 230 to only transmit certain types of messages and/or transactions, e.g., financial authorizations, until the load has decreased. In these cases, transaction data can be stored locally in the article dispensing machine 230, such as in the article dispensing machine memory storage device 281, until a predetermined time interval elapses, when a predetermined number of transactions is reached, until communication with the central controller 302 can be reestablished, or the load at the central controller 302 has decreased. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302 and central database 304 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in an inventory database can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article.

Figure 6:
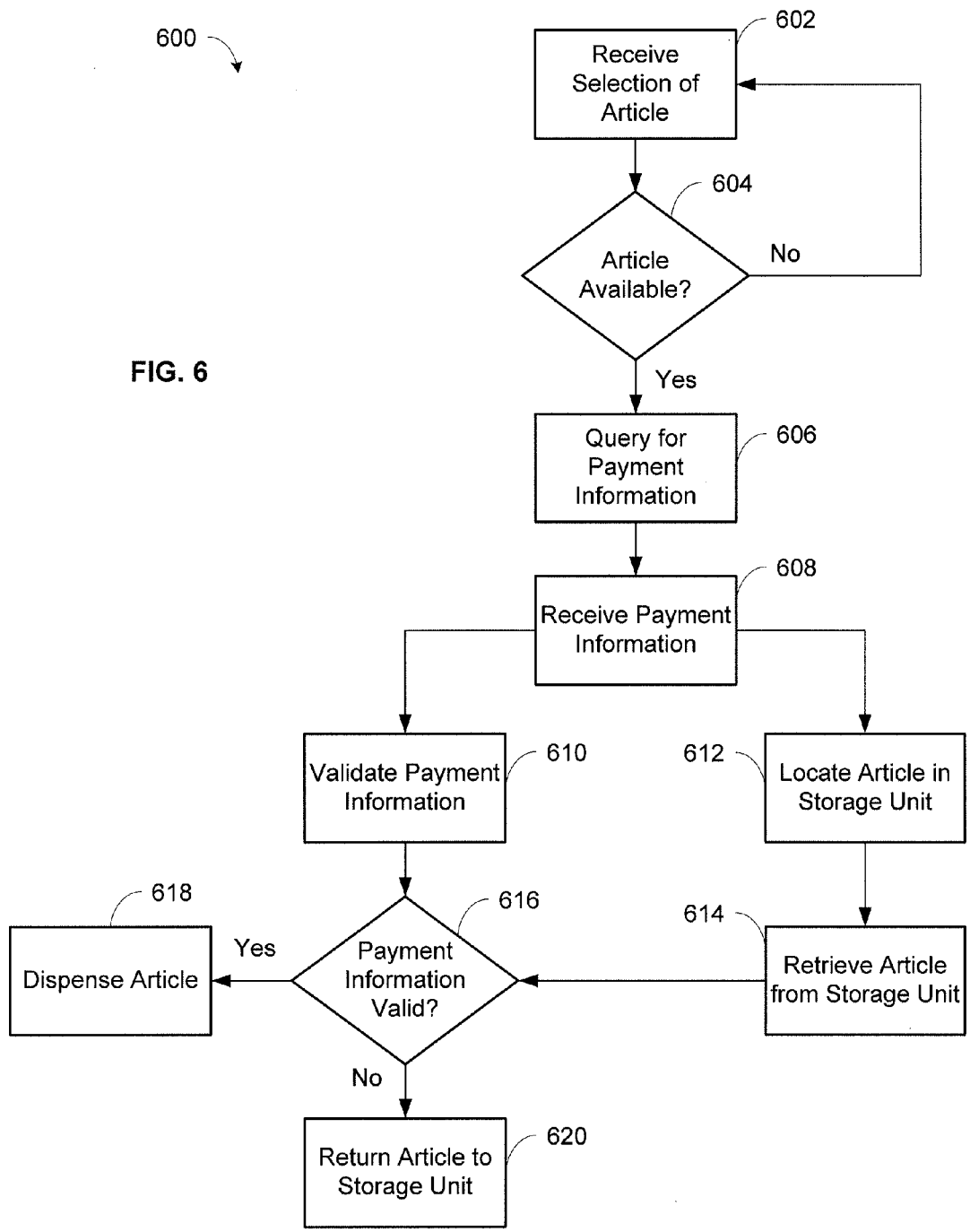
FIG. 6 is a flowchart illustrating operations for simultaneous article retrieval and transaction validation in an article dispensing machine.

An embodiment of a process 600 for simultaneously retrieving a selected article, such as a media article, and validating a payment transaction for a balance related to the selected article is shown in FIG. 6. The process 600 can result in the quicker dispensing of the selected media article from an article dispensing machine 230 during a transaction. A media article may include a DVD, Blu-Ray disc, video game disc, or other media article. A consumer may rent and/or purchase a media article from the article dispensing machine 230. The consumer may provide payment information to satisfy a balance owed for the transaction. While the payment information is being validated, the selected media article may be retrieved from a storage unit 248 in the article dispensing machine 230 and positioned at an article transfer opening 244. The selected media article may be dispensed from the article dispensing machine 230 through the article transfer opening 244 after the payment information is determined to be valid. If the payment information is determined to be not valid, then the selected media article may be returned to the storage unit 248. By pre-positioning the selected the media article at the article transfer opening 244 while the payment information is being validated, the total time for a given transaction may be reduced and accordingly, a greater total number of transactions for the article dispensing machine may result because each total transaction time is reduced.

At step 602, a selected media article may be received at an article dispensing machine 230 as part of a request from a consumer. The consumer may initiate a transaction by interacting with the user interface 234 of the article dispensing machine 230. The consumer may browse or search for media articles through the user interface 234 that the consumer desires to rent or purchase from the article dispensing machine 230. One or more media articles may be selected by the consumer through the user interface 234 as part of the request, such as a rental transaction request or purchase transaction request. One or more identifiers, such as a title, catalog number, or serial number, may be associated with the selected media article. The identifier(s) may be received at step 602 at the processor 300 as part of the request.

It may be determined at step 604 whether the selected media article is available and physically located in the article dispensing machine 230. The processor 300 may access the article dispensing machine database 282 and/or the central database 304, for example, to determine whether the selected media article is available to be dispensed from the article dispensing machine 230. If the selected media article is not available in the article dispensing machine 230, then the process 600 may return to step 602 to receive another selection of a media article. The consumer may also be notified through the user interface 234 that the selected media article is not available in the article dispensing machine 230. However, if the selected media article is available in the article dispensing machine 230, then the process 600 may continue to step 606. At step 606, the processor 300 may query for payment information through the user interface 234. The query may be visual and/or audible to ask the consumer to provide payment information to satisfy a balance that may be owed for the transaction. For example, the balance may be for an initial amount that is owed for a first rental night of the selected media article. The query may include instructions to a consumer to swipe a payment card or enter information about the payment card and/or credits.

At step 608, the payment information may be received at the processor 300. The payment information may be received from the consumer through the user interface 234. A payment card and/or credits may be provided as the payment information to satisfy the balance owed for the transaction. A payment card may include a credit card or a debit card. The payment information may include the number of the payment card, the expiration date of the payment card, the card security code (also known as a card verification value (CVV2) or card verification code (CVC2)), and/or other information of the payment card. The payment information may be acquired via the card reader 240 or manually entered through the user interface 234 in response to the query of step 606.

One or more credits may be redeemed for the balance owed for the transaction. Credits may be associated with a particular consumer and electronically tracked in a database, such as the central database 304. Credits may be obtained through a one-time subscription, a periodic subscription, or be issued, for example. In one embodiment, the consumer may provide a unique customer identifier to access their credits. A unique customer identifier may include a payment card number, for example. Exemplary systems and methods for the acquisition, usage, and redemption of credits are disclosed in commonly owned U.S. Provisional Patent Application No. 61/538,898, filed Sep. 25, 2011 (System and Method for Redemption of Credits in a Variable Value Transaction); U.S. Provisional Patent Application No. 61/538,900, filed Sep. 25, 2011 (System and Method for Predictive Accrual of Credits in a Variable Value Transaction); U.S. Provisional Patent Application No. 61/538,901, filed Sep. 25, 2011 (System and Method for Optimized Redemption of Credits in a Variable Value Transaction); U.S. Provisional Patent Application No. 61/538,902, filed Sep. 25, 2011 (System and Method for Management of Credit Subscriptions); and U.S. Provisional Patent Application No. 61/538,903, filed Sep. 25, 2011 (System and Method for Currency Conversion Related to Credits Redeemable in a Variable Value Transaction), each of which are herein incorporated by reference in their entirety.

The payment information may be validated at step 610 following the receipt of the payment information at step 608. In the case of a payment card, the processor 300 may communicate with the financial server 305 at step 610 to authorize the payment capability of the payment card as well as to process the payment card for the balance owed for the transaction. The payment card number may be hashed with a hash function prior to communication of the payment card number to the financial server 305. The hash function may be implemented on the article dispensing machines 230 and may be, for example, a SHA-256 hashing algorithm. If the payment information includes credits, one or more credits may be redeemed for the balance owed at step 610. The validation of the payment information at step 610 is described in further detail below with regards to FIG. 7.

The process 600 may also continue to step 612 following the receipt of the payment information at step 608. In particular, steps 612 and 614 related to the physical retrieval of the selected media article from the storage unit 248 may be performed simultaneously and in parallel with the validation of payment information at step 610. In this way, the total transaction time may be reduced and the selected media article may be dispensed to the consumer more quickly, if the payment information is determined to be valid. In contrast, the total transaction time may be longer if the selected media article is not retrieved from the storage unit 248 until after the payment information is validated. It should be noted that although step 610 for validation of the payment information and steps 612 and 614 for retrieval of the selected media article may be performed simultaneously, the steps may but do not necessarily begin or end at the same time. At step 612, the selected media article may be located in the storage unit 248 of the article dispensing machine 230. The physical location of the selected media article may be stored in the article dispensing machine database 282, for example, and may include a specific compartment, rack, slot, and/or other location identifier in the storage unit 248 where the selected media article is physically located.

At step 614, the selected media article may be retrieved from the physical location in the storage unit 248, as identified at step 612. A picker device 264 may be directed to the compartment, rack, or slot of the storage unit 248 where the selected media article is located. The identity of the selected media article may be verified, such as by the sensor 370, as each article may have a unique identifier, such as a barcode, serial number, radio frequency identification (RFID) tag, or other identifier, that identifies the article and/or characteristics of the article, such as a title, type, and other information. The picker device 264 may retrieve the selected media article from the compartment, rack, or slot of the storage unit 248. The picker device 264 may subsequently be directed to move the selected media article to a location near the article transfer opening 244. Therefore, the selected media article may be pre-positioned to be immediately dispensed from the article dispensing machine 230, pending validation of the payment information at step 610.

Following step 610 for performing validation of the payment information and step 614 for retrieving the selected media article from the storage unit 248, the process 600 continues to step 616. At step 616, it is determined whether the payment information is valid. If the payment information is valid at step 616, then at step 618, the selected media article may be dispensed from the article dispensing machine 230 through the article transfer opening 244. However, if the payment information is not valid at step 616, then at step 620, the selected media article may be returned to the storage unit 248. In particular, the picker device 264 may be directed to move the selected media article from the location near the article transfer opening 244 back to a compartment, rack, or slot of the storage unit 248. The specific compartment, rack, or slot that the selected media article is returned to at step 620 may be the same or different compartment, rack, or slot that the selected media article was retrieved from at step 614. If the selected media article is returned to a different compartment, rack, or slot, then the new physical location of the selected media article in the storage unit 248 may be recorded in the article dispensing machine database 282.

In some embodiments, the different compartment, rack, or slot that the selected media article is returned to may be a location that is closer to the article transfer opening 244 for quicker future dispensing. For example, this may be the case if the selected media article is a new release that is more likely be rented or purchased by a future consumer. In other embodiments, the different compartment, rack, or slot that the selected media article is returned to may be a location that is farther from the article transfer opening 244. For example, this may be the case if the selected media article is an older release that is less likely to be rented or purchased by a future consumer.

In some embodiments, a task may be scheduled and executed by the processor 300 at steps 612 and 614 to retrieve the selected media article from the storage unit 248. The task may be executed simultaneously with step 610 for validating the payment information. If the payment information is valid at step 616, then the processor 300 may issue a command to the task to direct the picker device 264 to dispense the selected media article at step 618. If the payment information is not valid at step 616, then the processor 300 may issue a different command to the task to direct the picker device 264 to return the selected media article to the storage unit 248 at step 620.

Figure 7:
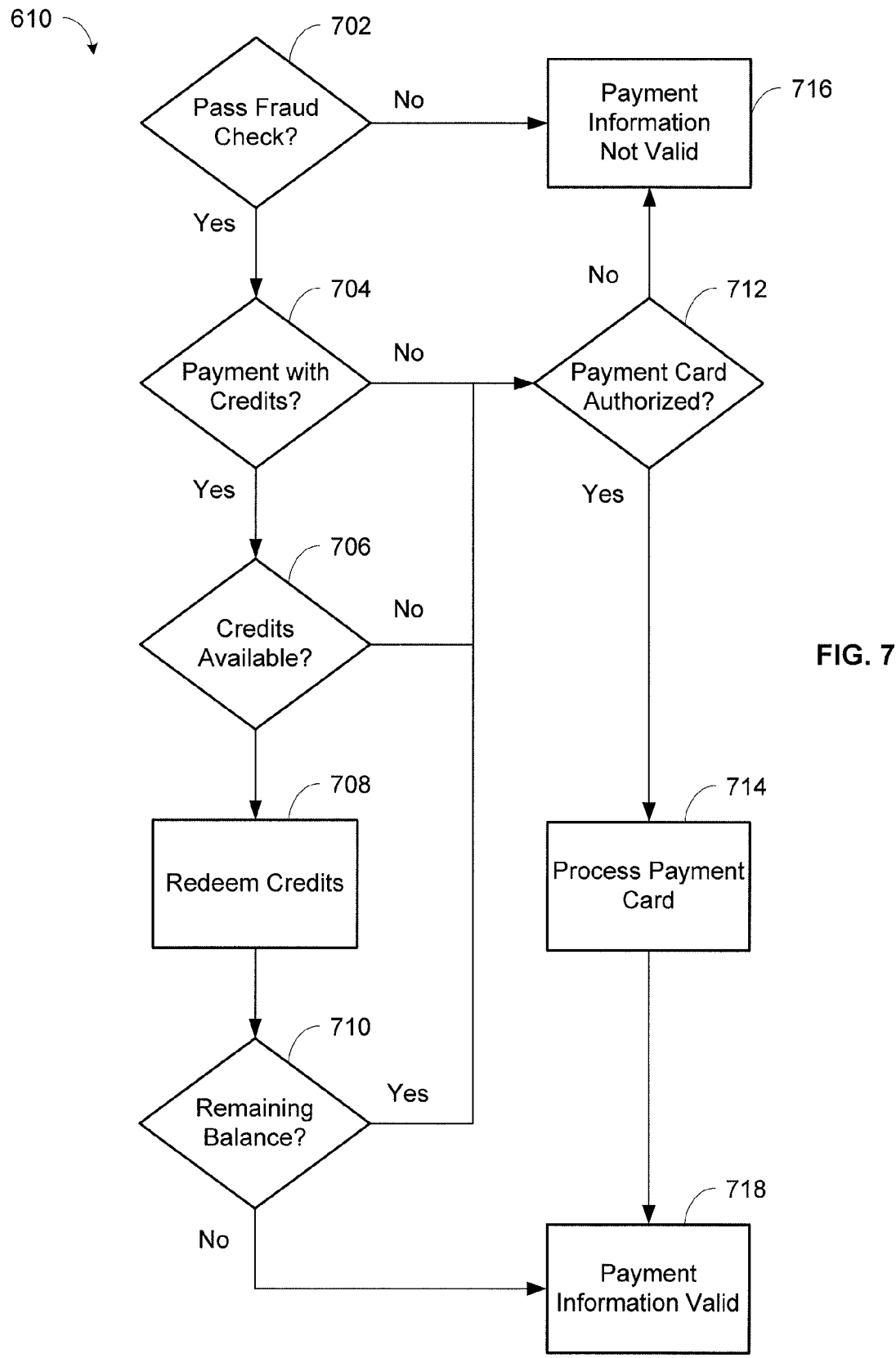
FIG. 7 is a flowchart illustrating operations for validating payment information.

An embodiment of a process 610 for validating payment information is shown in FIG. 7. The process 610 corresponds to step 610 of the process 600 shown in FIG. 6, described above. The payment information provided by the consumer may include a payment card and/or credits, and once validated, may be used to satisfy a balance owed for the transaction involving the selected media article. As described above, the process 610 may be performed simultaneously and in parallel with steps 612 and 614 to retrieve the selected media article from the storage unit 248. At step 702, it may be determined whether the consumer passes a fraud check. The fraud check may include whether the consumer is eligible for the transaction, based on unpaid debts, a history of declined payment cards, appearance on a customer blacklist, and other risk factors. If the fraud check is not passed, then the payment information may be deemed as not valid at step 716. In this case, the consumer may not be allowed to rent and/or purchase the selected media article.

In one embodiment, a fraud check may be performed for the consumer if a unique customer identifier has been obtained and/or an account exists for the consumer. If no unique customer identifier has been obtained and/or no account exists for the consumer, step 702 may be optional.

If the fraud check is passed at step 702, then the process 610 continues to step 704. At step 704, it is determined whether the payment information includes credits. A consumer may redeem one or more credits for the balance owed for the transaction. If the payment information does not include credits at step 704, then the process 610 continues to step 712 to authorize the payment capability of the payment card to satisfy the balance owed. The processor 300 of the article dispensing machine 230 may communicate with the financial server 305, for example, to authorize whether the payment card has the capability to pay the balance owed for the transaction. If the payment capability is not authorized at step 712, then the payment information is deemed as not valid at step 716 and the consumer may not be allowed to rent or purchase the selected media article. However, if the payment capability is authorized at step 712, then the payment card may be processed at step 714 to pay for the balance owed. In one embodiment, processing of the payment card may include charging or billing an account at the affiliate or external vendor. In another embodiment, processing of the payment card may include using alternative methods of payment, such as PayPal, American Express Serve, Facebook Credits, frequent flyer mile redemption, and the like. Following processing of the payment card at step 714, the payment information may be deemed as valid at step 718.

Returning to step 704, if the payment information includes credits, then the process 610 continues to step 706. At step 706, it may be determined whether one or more credits are available and applicable to be redeemed to satisfy the balance owed for the transaction involving the selected media article. The processor may communicate with the financial server 305 or another system that tracks the number of credits for the consumer to determine whether credits are available. In one embodiment, credits may be used to satisfy all or a portion of the balance owed for the transaction. If no credits are available for the consumer to redeem at step 706, then the process 610 may continue to step 712 to authorize the payment capability of the payment card to satisfy the balance owed, as described above. For example, a consumer may desire to redeem credits for the transaction and therefore specifies credits as part of the payment information because the consumer believes that they have credits available. However, if the consumer has exhausted their credits or does not have sufficient credits, then it may be determined at step 706 that credits are not available. As another example, the consumer may have credits that are not applicable to the selected media article because the credits may only be redeemable for certain types of media articles. In this case, it may also be determined at step 706 that credits are not available.

If credits are available for the consumer to redeem at step 706, then at step 708, one or more credits may be redeemed to satisfy all or a portion of the balance owed for the transaction. Continuing to step 710, it may be determined whether there is a remaining portion of the balance owed for the transaction. There may be a remaining portion of the balance owed if the redeemed credits did not satisfy the entire balance owed, for example. If there is a remaining portion of the balance owed at step 710, then the process 610 continues to step 712 to authorize the payment capability of the payment card to satisfy the remaining portion of the balance owed, as described above. However, if there is not a remaining portion of the balance owed at step 710, i.e., the balance owed has been fully satisfied by redeeming credits, then at step 718, the payment information may be deemed as valid.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A method of dispensing a selected article of a plurality of articles from an article dispensing machine, the article dispensing machine comprising a user interface, a processor, a selector device driven by a motor, and a storage unit for holding the plurality of articles, the method comprising:
   receiving a request related to the selected article through the user interface at the processor;
   receiving payment information for a balance related to the request through the user interface at the processor;
   determining whether the payment information is valid, using the processor;
   retrieving the selected article from the storage unit via the selector device driven by the motor simultaneously with the step of determining whether the payment information is valid;
   dispensing the selected article from the article dispensing machine, if the payment information is valid; and
   returning the selected article to the storage unit, if the payment information is not valid.

2. The method of claim 1, wherein the request related to the selected article comprises at least one of a rental transaction request or a purchase transaction request.

3. The method of claim 1, wherein the payment information comprises one or more of a payment card or a credit.

4. The method of claim 3, wherein determining whether the payment information is valid comprises:
   authorizing a payment capability of the payment card for the balance, using the processor;
   processing the payment card for the balance, using the processor, if the payment card is authorized; and
   transmitting from the processor that the payment information is not valid, if the payment card is not authorized.

5. The method of claim 3, wherein determining whether the payment information is valid comprises:
   determining whether the credit is available, using the processor; and
   redeeming the credit for the balance, if the credit is available, using the processor.

6. The method of claim 3, wherein determining whether the payment information is valid comprises:

redeeming the credit for an initial portion of the balance, using the processor;
authorizing a payment capability of the payment card, using the processor;
processing the payment card for a remaining portion of the balance, using the processor, if the payment card is authorized, wherein the remaining portion is equal to the initial portion subtracted from the balance; and
transmitting from the processor that the payment information is not valid, if the payment card is not authorized.

7. The method of claim 1, wherein determining whether the payment information is valid comprises:
determining whether a customer passes a fraud check, wherein the fraud check comprises whether the customer is eligible to receive the selected article; and
transmitting from the processor that the payment information is not valid, if the customer does not pass the fraud check.

8. The method of claim 1, wherein retrieving the selected article from the storage unit comprises:
determining a location of the selected article in the storage unit; and
moving the selected article from the location in the storage unit to an article transfer opening at least partially via the selector device driven by the motor.

9. The method of claim 8, wherein the selector device is a selector arm and includes a U-shaped picker device.

10. The method of claim 1, wherein dispensing the selected article from the article dispensing machine comprises dispensing the selected article through an article transfer opening, if the payment information is valid.

11. The method of claim 1, further comprising:
determining whether the selected article is physically located in the article dispensing machine, using the processor; and
querying for the payment information through the user interface, using the processor, only if the selected article is physically located in the article dispensing machine.

12. The method of claim 1, wherein the selected article comprises a disc.

13. The method of claim 1, including querying for payment information prior to the step of receiving payment information for a balance related to the request.

14. The method of claim 13, wherein the step of retrieving the selected article from the storage unit via the selector device driven by the motor occurs after the step of querying for payment information.

15. The method of claim 1, including locating the selected article in the storage unit simultaneous with the step of determining whether the payment information is valid.

16. The method of claim 15, wherein the step of receiving payment information for a balance related to the request precedes the step of locating the selected article in the storage unit.

17. The method of claim 1, wherein the method includes pre-positioning the selected article at an article transfer opening of the article dispensing machine simultaneous with the step of determining whether the payment information is valid.

18. The method of claim 17, wherein the step of dispensing the selected article from the article dispensing machine, if the payment information is valid, comprises dispensing the selected article through the article transfer opening.

19. The method of claim 17, further comprising keeping the pre-positioned article at the article transfer opening at least until the validity of the payment information is determined.

20. The method of claim 1, wherein the step of retrieving the selected article from the storage unit via the selector device driven by the motor includes retrieving the selected article from a first location in the storage unit,
wherein the step of returning the selected article to the storage unit, if the payment information is not valid, includes returning the selected article to a second location in the storage unit, and
wherein the second location is different than the first location.

21. The method of claim 1, wherein the step of receiving payment information for a balance related to the request precedes the step of retrieving the selected article from the storage unit via the selector device.

22. The method of claim 1, wherein the step of returning the selected article to the storage unit, if the payment information is not valid includes returning the selected article to the storage unit based on the determination of whether the payment information is valid.

23. A non-transitory computer readable medium for dispensing a selected article of a plurality of articles from an article dispensing machine, the article dispensing machine comprising a user interface, a processor, a selector device driven by a motor, and a storage unit for holding the plurality of articles, the computer readable medium comprising:
a first code segment for receiving a request related to the selected article through the user interface at the processor;
a second code segment for receiving payment information for a balance related to the request through the user interface at the processor;
a third code segment for determining whether the payment information is valid, using the processor;
a fourth code segment for retrieving the selected article from the storage unit via the selector device driven by the motor simultaneously with the step of determining whether the payment information is valid;
a fifth code segment for dispensing the selected article from the article dispensing machine, if the payment information is valid; and
a sixth code segment for returning the selected article to the storage unit, if the payment information is not valid.

24. The non-transitory computer readable medium of claim 23, wherein the payment information comprises one or more of a payment card or a credit.

25. The non-transitory computer readable medium of claim 24, wherein the third code segment for determining whether the payment information is valid comprises:
a seventh code segment for authorizing a payment capability of the payment card for the balance, using the processor;
an eighth code segment for processing the payment card for the balance, using the processor, if the payment card is authorized; and
a ninth code segment for transmitting from the processor that the payment information is not valid, if the payment card is not authorized.

26. The non-transitory computer readable medium of claim 24, wherein the third code segment for determining whether the payment information is valid comprises:
a tenth code segment for determining whether the credit is available, using the processor; and an eleventh code segment for redeeming the credit for the balance, if the credit is available, using the processor.

27. The non-transitory computer readable medium of claim 24, wherein the third code segment for determining whether the payment information is valid comprises:
   a twelfth code segment for redeeming the credit for an initial portion of the balance, using the processor;
   a thirteenth code segment for authorizing a payment capability of the payment card, using the processor;
   a fourteenth code segment for processing the payment card for a remaining portion of the balance, using the processor, if the payment card is authorized, wherein the remaining portion is equal to the initial portion subtracted from the balance; and
   a fifteenth code segment for transmitting from the processor that the payment information is not valid, if the payment card is not authorized.

28. The non-transitory computer readable medium of claim 23, wherein the third code segment for determining whether the payment information is valid comprises:
   a sixteenth code segment for determining whether a customer passes a fraud check, wherein the fraud check comprises whether the customer is eligible to receive the selected article; and
   a seventeenth code segment for transmitting from the processor that the payment information is not valid, if the customer does not pass the fraud check.

29. The non-transitory computer readable medium of claim 23, wherein the fourth code segment for retrieving the selected article from the storage unit comprises:
   an eighteenth code segment for determining a location of the selected article in the storage unit; and
   a nineteenth code segment for moving the selected article from the location in the storage unit to an article transfer opening at least partially via the selector device driven by the motor.

30. The non-transitory computer readable medium of claim 23, wherein the fifth code segment for dispensing the selected article from the article dispensing machine comprises a twentieth code segment for dispensing the selected article through an article transfer opening, if the payment information is valid.

31. The non-transitory computer readable medium of claim 23, further comprising:
   a twenty-first code segment for determining whether the selected article is physically located in the article dispensing machine, using the processor; and
   a twenty-second code segment for querying for the payment information through the user interface, using the processor, only if the selected article is physically located in the article dispensing machine.

32. A method of dispensing a selected article from an article dispensing machine, the article dispensing machine comprising a processor, a selector device driven by a motor, and a storage unit, the method comprising:
   receiving a request related to the selected article at the processor;
   receiving payment information for a balance related to the request;
   determining whether the payment information is valid;
   simultaneously (a) retrieving the selected article from the storage unit via the selector device driven by the motor while (b) performing the determination of whether the payment information is valid; and
   dispensing the selected article from the article dispensing machine, if the payment information is valid.

33. The method of claim 32, wherein the step of receiving payment information for a balance related to the request precedes the step of retrieving the selected article from the storage unit via the selector device.

34. The method of claim 32, including returning the selected article to the storage unit based on a determination that the payment information is not valid.

* * * * *